Figure 1:
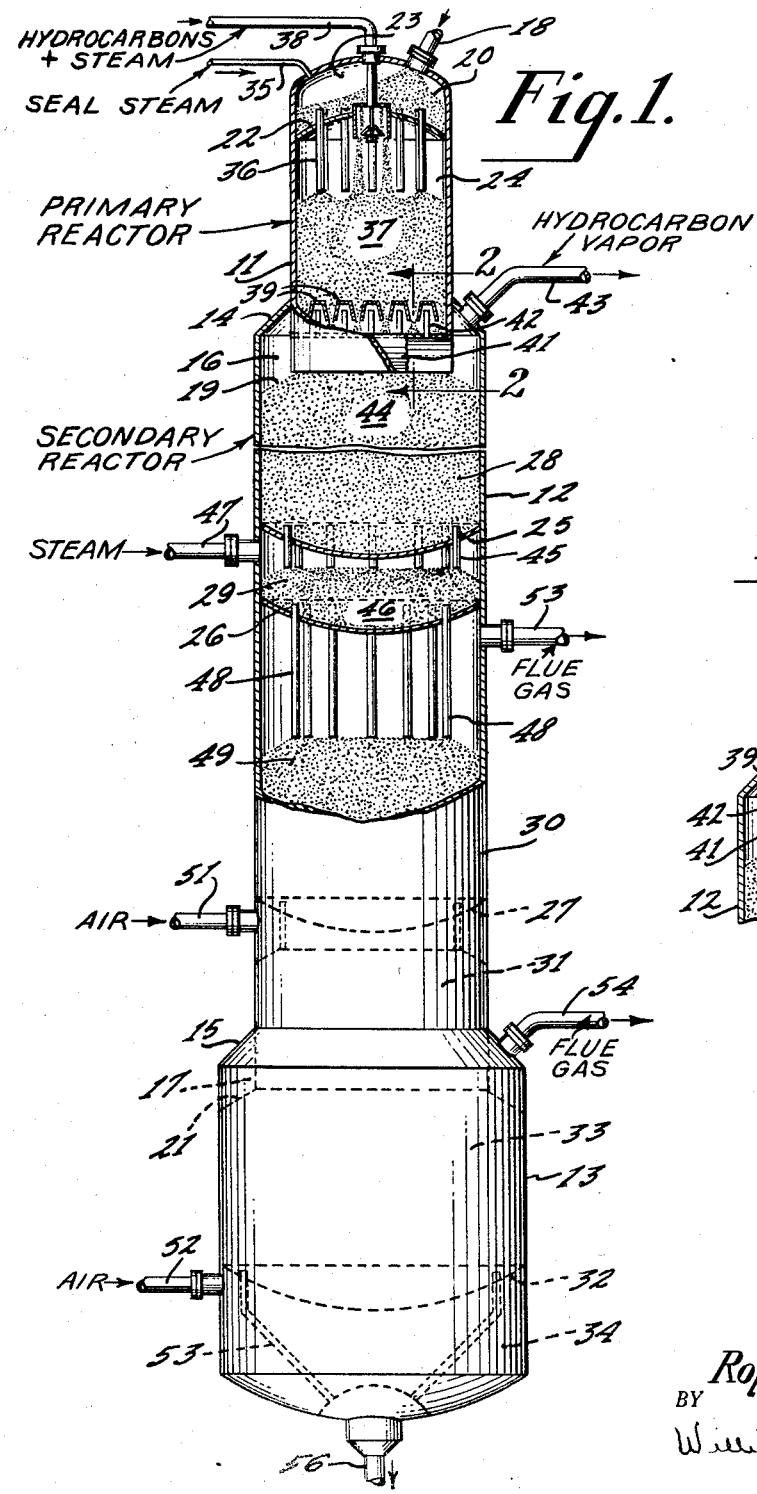

May 3, 1960 — R. E. BLAND — 2,935,461
CATALYTIC CRACKING OF HEAVY CHARGE STOCKS
Filed Jan. 20, 1956

INVENTOR.
Rophie E. Bland
BY
ATTORNEY.

2,935,461

CATALYTIC CRACKING OF HEAVY CHARGE STOCKS

Rophie E. Bland, Paoli, Pa., assignor to Houdry Process Corporation, Wilmington, Del., a corporation of Delaware Application January 20, 1956, Serial No. 560,330

4 Claims. (Cl. 208—74)

This invention relates to a process for the catalytic cracking of heavy charge stocks to produce high-octane gasoline and light distillate fuels. The invention is particularly directed to the so-called moving-bed type of process in which hydrocarbons contact hot granular catalyst of a particle-size in the range of about 2–13 mm. while the latter gravitates through the reaction zone as a compact moving bed, and in which the catalyst is continuously circulated through alternate stages of reaction and regeneration.

Typical of the processes to which the invention relates is that described in an article entitled "How Houdresid Works on Heavy Stocks" by Rophie E. Bland, appearing in the September 1955 issue of "Petroleum Refiner."

In the process described therein, residuum cuts ranging from crude tower bottoms to vacuum bottoms, including residua high in sulfur or nitrogen, are employed as a charge stock to a catalytic cracking unit comprising a reactor and a kiln embodied as separate units within a single vessel wherein optimum conditions of catalyst flow are obtained by passing the catalyst as a continuous compact flowing mass downwardly along a confined path comprising superimposed reaction and regenerating zones.

Continuous circulation of the catalyst may be effected through pneumatic or mechanical means which receives regenerated catalyst by gravity flow from the regenerating zone or kiln at the bottom of the vessel and elevates the same to a raised location from which it may be returned by gravity flow to the reaction zone at the upper end of the vessel.

Preheated charge stock, comprising refinery crude-tower bottoms plus recycle gas oil from a synthetic crude tower is charged to the top of the reactor in liquid or at least predominantly liquid phase, and in admixture with a substantial quantity of steam. Contact between the mixed-phase charge and the fresh regenerator catalyst, also introduced at the top of the reactor, is effected in known manner. The granular catalyst and the mixed-phase charge flow concurrently through the reaction zone. At the bottom of the reaction zone the mixture of gaseous reaction products and steam is disengaged from the downwardly flowing catalyst and the latter is discharged into an expanded, relatively-shallow purge zone wherein the catalyst is engaged by countercurrently flowing steam to strip the catalyst of additional vaporizable material. The aforementioned disengaged gaseous material from the reaction zone and the gaseous effluent from the purging zone are collected within a common collecting zone at the juncture of the reaction and purge zones and are discharged from the vessel for subsequent treatment in other portions of the system.

To achieve the desired conversion, the reaction zone and the purge zone must provide sufficient total residence time in which to effect both the initial conversion of the lighter components of the charge stock and the final conversion of the less-readily cracked components, the latter occurring in the bottom region of the reaction zone and in the purge zone wherein there is provided the additional soaking time required to crack the heavy asphaltic oil.

A fuller description of the aforementioned process is given in copending application Serial No. 421,226 of George A. Mills et al., filed April 6, 1954, to cover a method for catalytically cracking the heavy bottoms portion of petroleum stocks, containing considerable amounts of tarry and asphaltic residua, and wherein it is pointed out that the effects of changes in operating variables on the distribution and yields of the cracked products obtained which have heretofore been observed in the customary catalytic cracking of lighter hydrocarbon charge fractions, such as gas oils, do not necessarily apply in the cracking of heavy residua.

It has been found, however, that greater flexibility of operation and economic advantages may be obtained by conducting the cracking operation in two stages within successive reaction zones, and with intermediate removal of the first-stage reaction products.

Thus, in accordance with the present invention a charge stream comprising hydrocarbons which are normally unvaporizable at temperatures below about 900° F. is introduced to a primary reaction zone where, in the presence of a substantial quantity of steam and a compact moving mass of granular catalyst the charge is subjected to such conditions of temperature and time as will serve to crack the lighter hydrocarbons. The initially formed gaseous reaction products are then removed from the catalyst mass and the latter, accompanied by the heavier hydrocarbons, is passed through a secondary reaction zone adapted to provide a substantial soaking period in which the heavier hydrocarbons are cracked in a high partial pressure steam atmosphere.

In a preferred embodiment, catalyst and fluid flow concurrently in the primary reaction zone and countercurrently in the secondary reaction zone, with removal of total gaseous product between the two zones.

Figure 2:
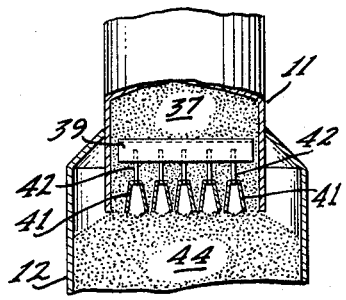

For a fuller understanding of the invention reference may be had to the following specification and claims taken in connection with the accompanying drawing forming a part of this application, in which:

Fig. 1 is an elevation view, in partial section, showing a typical treating unit adapted to carry out the method of the invention, comprising separate reaction and regeneration chambers arranged in superimposed relationship within a single unitary vessel; and Fig. 2 is a fragmentary view, in partial section, showing a side elevation of the gas disengaging elements of the primary reactor.

It will be understood that the treating vessel is part of a treating system comprising means for providing charge stock in suitable condition for introduction into the reactor and for effecting a desired treatment of the reactor discharge stream, such as that disclosed in the aforementioned article. Although illustration of the same is not considered necessary for a proper understanding of the present invention, such system includes also means of known design for maintaining continuous circulation of the granular catalyst through the treating unit. As previously stated, such means may comprise a pneumatic or mechanically operated lift by which the catalyst may be transferred from the bottom of the treating unit to the upper end thereof. Typical pneumatic means for such purpose is illustrated and described in an article entitled "Houdriflow—New Design in Catalytic Cracking" appearing in the January 13, 1949 issue of "The Oil and Gas Journal."

In Fig. 1 of the drawing, the treating unit is shown as comprising an elongated upright cylindrical vessel which is stepped to provide, in descending order, cylindrical sections 11, 12 and 13 of progressively increased diameter.

Each of the cylindrical sections has its lower end extending part way into the upper end of the section next below, so as to form an annular plenum between the interengaging ends of adjacent cylindrical sections. The upper ends of the middle and bottom cylindrical sections 12 and 13, respectively, are turned inwardly, as at 14 and 15, so as to close the upper end of the annular spaces or plenums 16 and 17, respectively.

Fresh generated catalyst, which has been returned from the bottom of the unit for recirculation, is introduced into the upper end of the treating vessel through inlet line 18. Where a pneumatic lift is employed for maintaining catalyst circulation, line or conduit 18 may receive separated catalyst from a gas-solids disengager located at the upper end of the lift path. In the case of mechanical elevating means, such as a bucket elevator, the inlet conduit may receive catalyst from the discharge chute of the elevator.

The catalyst gravitates through the treating vessel as a vertically continuous compact mass, passing successively through a series of chambers or zones wherein such mass is confined in the form of a broad compact moving bed. Transfer of the catalyst between adjacent beds is effected through a plurality of either short nipples or relatively long downcomers of a length suitable to provide the desired flow conditions and pressure differential between adjacent chambers or zones. In flowing from the lower ends of cylindrical sections 11 and 12, the mass of catalyst expands outwardly within the larger receiving sections to form expanded compact moving beds having annular exposed surface areas, as at 19 and 21, respectively, which form the lowermost boundaries of gas-collecting plenums 16 and 17.

Cylindrical section 11 is divided in its upper region by a tube sheet 22 which divides the section into an upper catalyst distributing chamber 23 and a lower primary reaction chamber 24, the latter being open at the bottom.

Cylindrical section 12 is provided with three tube sheets 25, 26 and 27 which, in descending order, divide the section into a secondary reaction chamber 28, a purging chamber 29, a first-stage regenerating chamber 30, and a cooling section 31.

The lowermost cylindrical section 13 is provided with a single tube sheet 32 in its lower region which divides the section into a second-stage regenerating chamber 33 and an air-introduction chamber or plenum 34.

It is a feature of the invention that the secondary reaction chamber 28 is of such vertical extent as to maintain therein a relatively-deep compact moving bed of catalyst, so that the heavier hydrocarbons which have not been removed at the bottom of the primary reactor will be afforded a relatively-long soaking time during which such heavier hydrocarbon components are catalytically cracked and are purged from the catalyst mass.

Describing a typical operation in accordance with the invention, the catalyst which has been introduced through conduit 18 forms a compact moving bed 20 within the distributing chamber 23. Seal steam introduced into the upper end of chamber 23 from conduit 35 prevents undesired gas flow between the primary reaction chamber 24 and the source of catalyst supply at the upper end of conduit 18.

Catalyst is transferred from chamber 23 to chamber 24 through elongated downcomers 36 which serve to maintain a bed of catalyst 37 at constant level within the primary reaction chamber. A portion of the catalyst is continuously discharged from bed 20 into chamber 24 through means of known design, such as that illustrated in U.S. Patent No. 2,636,805 to Lassiat et al., whereby the catalyst falls freely as an annular curtain and is deposited substantially uniformly over the central surface area of the bed 37. The catalyst flow arrangement is such that, regardless of variations in the flow of solids through the falling curtain, the flow through the downcomers 36 will be at all times sufficient to maintain the bed 37 at constant level.

The hydrocarbon charge, which may be a residuum cut ranging from crude-tower bottoms to vacuum bottoms, is supplied with accompanying steam as a preheated mixed phase stream through conduit 38 into the upper region of cylindrical section 11. The charge passes as a confined stream through distributing chamber 23 and is introduced into primary reaction chamber 24 at a central location within the free-falling annular curtain of catalyst. The liquid components of the hydrocarbon charge are deposited upon the catalyst particles as an outwardly-directed spray from within the annular falling curtain, and the coated particles of catalyst are then deposited upon the surface of the bed 37 in relatively uniform distribution.

As the hydrocarbon reactants flow concurrently with the catalyst within gravitating bed 37, the lighter hydrocarbon components are cracked, or otherwise converted to the desired gaseous product. In the bottom region of chamber 24 the catalyst flows through a gas-disengaging section of known design comprising, for example, a plurality of inverted channel members 39 and 41 arranged at a plurality of levels within such bottom region. At each disengaging level the channels are spaced and parallel, and extend across the reaction chamber. The arrangement of channels in the disclosed embodiment is more clearly illustrated in Fig. 2. Two levels of channels are shown, but additional levels may be provided if desired. The channel members 39 at the uppermost level are closed at their ends and terminate closely adjacent to the walls of the cylindrical section 11. The channel members 41 at the lowermost level are substantially deeper than the channels 39 and have their lower edges substantially at a common level with the lower end of cylindrical section 11. Channel members 41 are open at their ends and extend through slots or notches formed in the lower end portion of the cylindrical section 11, so that open gaseous communication is constantly provided between the gas-collecting spaces beneath inverted channel members 41 and the gas-collecting plenum 16. A series of vertical nipples or conduits 42 extend upwardly through and above the upper ends of deep channels 41 and terminate within the spaces beneath the channel members 39. Means, not shown, are provided so that the channel members 39 may be rigidly supported by the conduits 42. In a preferred embodiment, channel members 39 overlie channel members 41 at right angles.

Conduits 42 provide continuous gaseous communication between the spaces beneath channels 39 and 41, so that the initial portion of gaseous material disengaged from the gravitating mass of solids and collected in the spaces beneath the channels 39 may be conveyed through the conduits 42 and discharged into the spaces beneath the channels 41, from which latter channels such gaseous material, together with additional gaseous material disengaged from the mass of solids flowing directly under the channels 41, is discharged into the plenum 16.

A vapor discharge conduit 43 is provided at the upper end of plenum 16 to transfer the gaseous material collected therein to other portions of the system, not shown. All the gaseous material disengaged from the catalyst as it leaves the bottom of cylindrical section 11, including the gaseous material disengaged through the annular exposed surface 19 of bed 44, is collected in plenum 16 and is removed directly from the vessel through outlet 43. The heavier components of the hydrocarbon charge, not having sufficient residence time within the primary reaction zone to effect the desired cracking, are conveyed with or upon the catalyst particles into the expanded bed 44 contained within the secondary reaction zone 28. As previously stated, bed 44 is of sufficient depth to provide a relatively long soaking time of sufficient duration to crack or otherwise convert such heavier components.

Catalyst is withdrawn from the bottom of bed 44 through a plurality of nipples 45 set in the tube-sheet 25, and distributed so as to effect uniform withdrawal from the bed. The catalyst is discharged directly onto the surface of a relatively-shallow bed 46 maintained within the chamber 29. Steam is introduced through conduit 47 into the upper region of chamber 29 in the catalyst-free space above the surface of bed 46. The steam enters bed 46 and passes upwardly through nipples 45 into bed 44. The steam flows countercurrently to the catalyst gravitating through the nipples in bed 44 and strips or purges the catalyst of additional vaporizable hydrocarbon material. The steam, together with such additional gaseous products of conversion, is disengaged from bed 44 at the annular exposed surface 19 of the bed 44, as well as at the exposed surfaces of the bed beneath the deep channels 41. Thus, the cracked hydrocarbons and other gaseous reaction products, together with the steam which has been introduced through inlet conduits 38 and 47, are removed from both the primary and secondary reactors through the common discharge conduit 43.

The purged catalyst gravitates in compact flow from the bottom of bed 46 through elongated downcomers 48 into the regeneration zone 30, the downcomers 48 being so arranged as to distribute the catalyst uniformly over the surface of the compact moving bed 49. While gravitating through zone 30 the catalyst in bed 49 is engaged by a countercurrently flowing stream of combustion-supporting gas, such as air, supplied by conduit 51 to the space beneath the tube sheet 27 supporting the bed 49. Conventional means, not shown, is associated with tube-sheet 27 for passing the air upwardly into bed 49 and for passing the catalyst downwardly from bed 49 into cooling section 31.

The partially regenerated catalyst passes through cooling section 31 as a compact moving bed and discharges directly into the expanded cylindrical section 13, thereby forming the annular exposed surface area 21. Section 13 contains the secondary regeneration zone 33. In the latter zone the catalyst continues to flow as a compact moving bed and is engaged by additional air supplied by conduit 52 to the space beneath the tube-sheet 32, conventional means, not shown, again being used to introduce the air into the bed.

The gaseous products of regeneration, or flue gas, formed in the primary regeneration zone 29 is discharged therefrom through outlet conduit 53. The additional flue gas formed in the secondary regeneration zone 33 is disengaged at the annular exposed surface area 21 and collected in the annular plenum 17, from which it is discharged through outlet conduit 54.

The fully regenerated catalyst is discharged from the secondary regeneration zone 33 through a plurality of conduits 55 which withdraw separate streams of catalyst from uniformly-distributed bottom regions of the bed and which convey the separate streams into a common discharge conduit 56 at the bottom of the vessel.

The various nipples or downcomers which convey the catalyst between the separate confined zones within the cylindrical sections 11, 12 and 13 are of such size and length as to provide uniform, uninterrupted flow of solids through the vessel and uniform distribution of the solids within each of the receiving locations. Where necessary, the compact streams of catalyst flowing through the downcomers or nipples provide a seal against undesirable flow of gaseous material between adjacent zones.

Through the stagewise reaction provided by the method of the present invention, and the stepwise disengagement and removal of gaseous reaction products, several distinct advantages are obtained. Because of the inherent nature of the above-described two-stage operation, charging stocks comprising components which have different susceptibility to cracking are processed in such manner that the more-readily cracked components are cracked and removed in the primary stage, while leaving associated with the catalyst substantially only those components which are less readily cracked and which require a longer contact or "soaking" time to effect the desired degree of cracking. The removal of the cracked products from the first stage prevents over-cracking of such products by continued contact with catalyst at cracking conditions. Since over-cracking results in an undesired distribution of products, including higher yields of gaseous products and coke, the prevention of over-cracking thus reduces the amount of coke resulting from processing the more-readily cracked components of the charge stock.

In the second stage, the less-readily cracked portion of the charge, after being freed of the more-readily cracked materials, is permitted to remain in contact with the catalyst for the desired length of time necessary to effect the optimum degree of conversion to lighter products, with subsequent removal thereof. In this way, the amount of coke resulting from the conversion of the less-readily cracked components is likewise held at a desirable low level, in that the optimum time for the conversion and purging is made available at improved and controlled conditions. Thus, in operations where the desired amount of conversion of heavy charge stocks is to a relatively low level consistent with the production of maximum amounts of gas oil suitable as charging stock for standard catalytic cracking operations, such conversion is achieved with the minimum amount of undesirable side reactions which otherwise may result in the production of undesirably large yields of light gaseous products and/or coke on the catalyst.

Since the gaseous reaction products of the first reaction stage are disengaged from the catalyst and removed from the reaction zone and the vessel before the catalyst and accompanying heavier hydrocarbons are subjected to the second stage reaction, there is a substantial deduction in the partial pressure of hydrocarbons in the secondary reactor. Consequently, the secondary reaction is advantageously carried out in a relatively-high partial pressure steam atmosphere. Such operation is quite likely to result in a substantially lowered overall process steam requirement.

While the present invention has been indicated as having particular application to the treatment of such charge stocks as reduced crude or refinery crude-tower bottoms, as well as vacuum bottoms, including residue containing high contaminate concentrations or having a high sulfur or nitrogen content, it is to be understood that the invention is equally applicable to various other charge stocks. Since the process of the invention is particularly adapted for the treatment of hydrocarbons which are normally unvaporizable at temperatures below about 900° F., it will be readily apparent to those skilled in the art that the process is also applicable to charge stocks other than those which are bottom products of distillation. The charge stock, for example, may comprise a mixture of heavy residua together with lighter components, or it may comprise materials which normally occur as a solid product which is not derived through chemical processing.

I claim:

1. In the catalytic cracking of a hydrocarbon charge stock comprising heavy hydrocarbon components which are not vaporizable at temperatures below about 900° F. and which normally contain metallic contaminants in substantial concentration, said cracking reaction being carried out in the presence of a compact moving mass of hot granular catalyst and in the presence of a high partial pressure of steam so as to inhibit poisoning of said catalyst by said metallic contaminants, the improvement which comprises the steps of: introducing said charge stock, in partially vaporous phase, together with a substantial quantity of steam in the order of at least about 20–25 wt. percent based on said charge, into a primary reaction zone wherein said catalyst gravitates as a first compact moving bed; passing the hydrocarbon/steam mixture concurrently with said catalyst through said primary reaction zone so as to vaporize the more readily vaporizable components of said charge; disengaging and removing the steam and gaseous hydrocarbon effluent of said primary reaction at the bottom of said primary reaction zone; passing said catalyst, containing the more difficultly vaporizable hydrocarbons from the bottom of said primary reaction zone into a secondary reaction zone wherein said catalyst gravitates as a second compact moving bed at a rate which provides a relatively long soaking time in which to effect said secondary reaction; introducing an additional relatively minor quantity of steam at the bottom of said secondary reaction zone and passing said steam countercurrently through said second compact moving bed in order to purge the bed of any vaporizable material accompanying the catalyst and additional vaporizable material formed within said secondary reaction zone, said minor quantity of steam being sufficient to maintain a high partial pressure of steam within said secondary reaction zone by reason of the low partial pressure of hydrocarbons therein resulting from said removal of the gaseous hydrocarbon effluent from said primary reaction zone; disengaging said additional steam and the purged gaseous hydrocarbons from the top of said secondary reaction zone; collecting the total gaseous effluent of said primary and secondary reaction zones in a common collecting plenum between said zones; discharging said total gaseous effluent from said plenum; and discharging said catalyst at the bottom of said secondary reaction zone; whereby said cracking is accomplished with a minimum total steam requirement and without appreciable over-cracking of the readily-cracked components of said charge stock.

2. A method as in claim 1 in which said reaction zones are in superimposed relationship and said catalyst gravitates as a continuous compact moving mass comprising said first and second beds.

3. A method as in claim 1 in which said charge comprises liquid hydrocarbon components; and including the step of contacting at least a portion of said catalyst with said liquid hydrocarbons in the form of a spray, while said portion of catalyst falls freely within said first reaction zone and is deposited upon the surface of said first bed.

4. A method as in claim 1 in which the total steam introduced into said reaction zones is preferably not substantially in excess of 50 weight percent of the hydrocarbon fraction of said charge stock.

References Cited in the file of this patent

UNITED STATES PATENTS

| | | |
|---|---|---|
| 2,379,408 | Arveson | July 3, 1945 |
| 2,391,336 | Ogorzaly | Dec. 18, 1945 |
| 2,418,672 | Sinclair | Apr. 8, 1947 |
| 2,489,628 | Evans | Nov. 29, 1949 |
| 2,526,701 | Shirk | Oct. 24, 1950 |
| 2,548,286 | Bergstrom | Apr. 10, 1951 |
| 2,609,332 | Bowles et al. | Sept. 2, 1952 |
| 2,689,211 | Findlay | Sept. 14, 1954 |
| 2,726,938 | Lassiat | Dec. 13, 1955 |
| 2,745,724 | Kollgaard | May 15, 1956 |
| 2,834,658 | Lieffers et al. | May 13, 1958 |